P. PRAWL & F. H. WEMPLE.
Wheel-Plows.

No. 158,735. Patented Jan. 12, 1875.

WITNESSES:
Chas. Nida
A. F. Terry

INVENTOR:
Peterson Prawl
Francis H. Wemple
BY
ATTORNEYS.

UNITED STATES PATENT OFFICE.

PETERSON PRAWL AND FRANCIS H. WEMPLE, OF WAVERLY, ILLINOIS.

IMPROVEMENT IN WHEEL-PLOWS.

Specification forming part of Letters Patent No. 158,735, dated January 12, 1875; application filed October 31, 1874.

*To all whom it may concern:*

Figure 1:
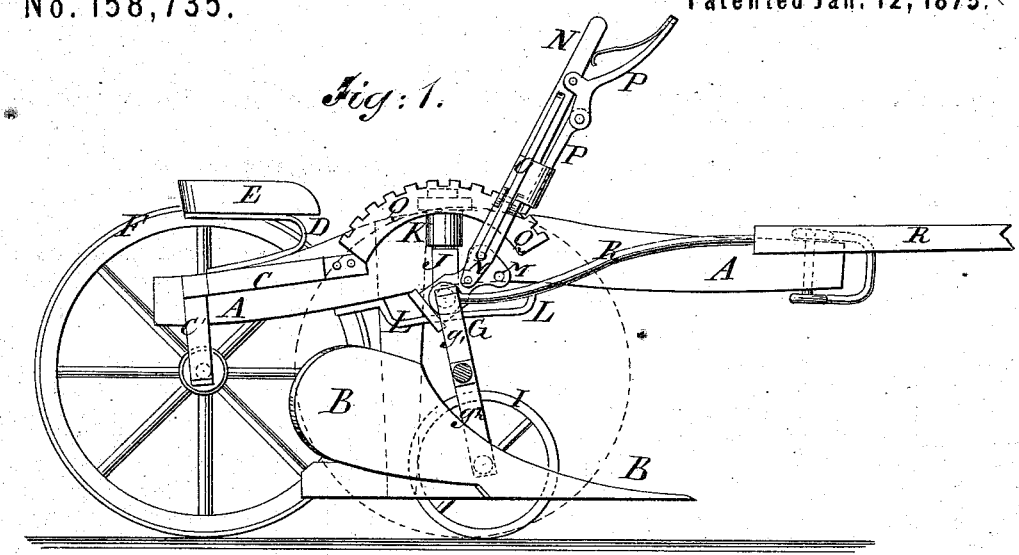
Figure 2:
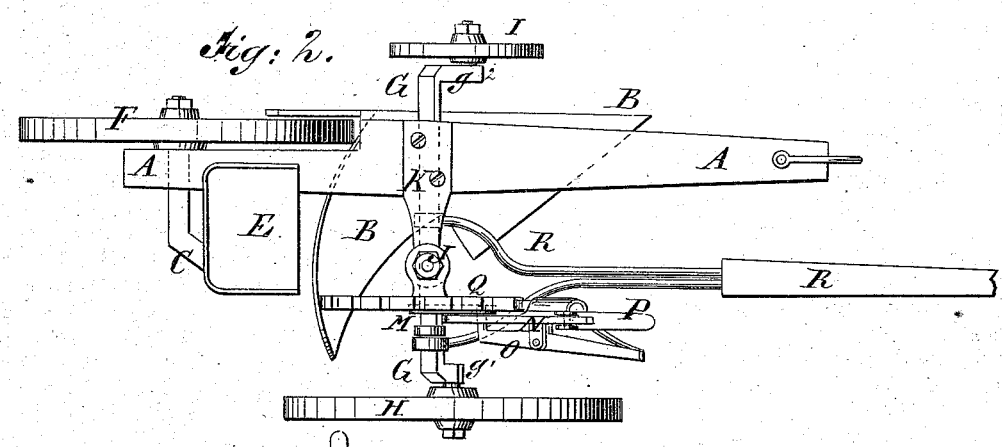
Figure 3:
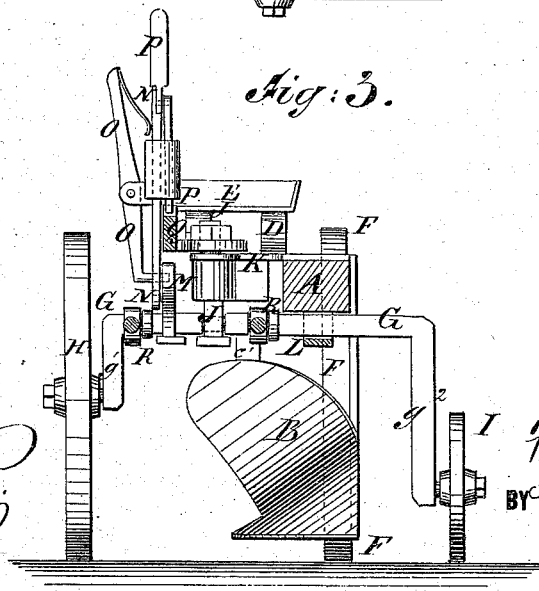

Be it known that we, PETERSON PRAWL and FRANCIS H. WEMPLE, of Waverly, in the county of Morgan and State of Illinois, have invented a new and useful Improvement in Riding-Plow, of which the following is a specification:

Figure 1 is a side view of our improved riding-plow, the right-hand wheel being removed. Fig. 2 is a top view of the same. Fig. 3 is a front view of the same, the beam and tongue being shown in section.

Similar letters of reference indicate corresponding parts.

The invention will first be fully described, and then pointed out in the claims.

A represents the plow-beam, to the forward end of which the draft is applied, and to which, a little in the rear of its center, is rigidly attached the standard of the plow B. To the rear end of the plow-beam A is attached a bracket, C, which projects upon the right-hand side of said beam, and to which are attached the spring-supports D for the driver's seat E. Upon the bracket C is formed, or to it is attached, an arm, $c'$, which projects downward, is bent at right angles to pass beneath the rear end of the beam A, and has a journal formed upon its end to receive the wheel F. The land side or left-hand side of the rear part of the beam A is cut away to receive the wheel F, so that the said wheel may run in the furrow opened by the plow B. G is an axle, which is placed beneath the middle part of the beam A, and the right-hand end of which is bent twice at right angles to form a short crank, $g^1$, to receive the wheel H, the said axle G being made of such a length that the wheel H will run in the furrow opened by the plow at its previous round. By this arrangement, both the wheels F H will run in the bottoms of furrows, so as to have smooth and level paths, and thus cause the plow to run true and steady, and cause it to do good work. The left-hand end of the axle G is bent twice at right angles to form a long crank, $g^2$, to receive the small wheel I, which is designed to be brought into contact with the ground only in turning. J is an arm, the lower end of which is forked to ride in a groove in the axle G, upon the right-hand side of the beam A, and is secured in place upon the said axle by a yoke attached to the ends of its forks, upon the lower side of the axle, so that the axle G may turn without carrying the arm J with it. The upper end of the arm J passes up through a hole in the projecting end of the arm K, the other end of which is firmly bolted to the beam A. The arms J K thus form a pivoting connection between the axle G and the beam A, to enable the plow to be turned in smaller space than would otherwise be possible. The swing of the axle G is limited by a keeper, L, attached to the under side of the beam A, and through which the said axle passes. M is an arm, the lower end of which is forked, and is rigidly secured to the axle G by a yoke, so that the said axle may be turned by turning the arm M. To the arm M, near the axle G, is pivoted the lower end of a lever, N, to the outer side of which is pivoted a lever-catch, O, the lower end of which is bent inward to pass through a hole in the lever N, and enter a hole in the upper end of the arm M, and thus rigidly connect the lever N and arm M with each other, so that the axle G may be turned by operating the lever N. The upper end of the arm M is made wide, and has two holes formed through it to receive the bent end of the lever-catch O. To the lever N is also attached a lever-pawl, P, the engaging end of which takes hold of the teeth or notches formed in the edge of the curved bar Q. Upon the side of the middle part of the notched bar Q is formed a lug, through a hole in which the upper end of the arm J passes, and which rests upon the end of the arm K. To move the small wheel I down to support the machine in a level position while being turned, the pawl P is released from the notched bar Q, and the lever N is moved forward until the lower side of the small wheel I is in the same horizontal plane with the lower side of the large wheel H. The lever-catch O is only used when the wheel H is to be raised to run upon the surface of the ground in opening the first furrow in laying out a land. In this case, the lever-catch O is operated to release the lever N, and the lever N is moved forward to the forward hole in the upper end of the arm M. The lever N is then moved to the rearward until the wheel H has been raised to the desired height. For ordinary plowing, the lever N is moved back to the rear hole of the arm M. The draft is applied to the forward end of the beam A, but the machine is guided by the tongue R. The rear end of the tongue R is forked, and is connected with the axle G. As shown in Fig. 2, the tongue R is arranged for use with three horses abreast. When only two horses are used abreast, the tongue R should be so adjusted upon the axle G as to be in line or nearly in line with the beam A.

Having thus described my invention, I claim as new and desire to secure by Letters Patent—

1. The loose arm J, pivoted on axle G, and swiveled to rigid arm K, as and for the purpose described.

2. The combination of the arm M, lever N, lever-catch O, lever-pawl P, and notched bar Q, with the axle G, the arms J K, and the plow-beam A, substantially as herein shown and described.

3. The arrangement of the transporting-wheels F H, in connection with the plow-beam A and plow B, to enable both of said wheels to run in furrows, substantially as herein shown and described.

PETERSON PRAWL.
FRANCIS H. WEMPLE.

Witnesses:
JOHN B. MOFFETT,
WM. H. COX.